United States Patent
Van Ert et al.

[19]

[11] Patent Number: 6,146,578
[45] Date of Patent: Nov. 14, 2000

[54] METHOD FOR MOLDING HEADLINERS

[75] Inventors: Jack M. Van Ert, Rochester Hills; George B. Byma, Clarkston, both of Mich.

[73] Assignee: Lear Corporation, Southfield, Mich.

[21] Appl. No.: 09/048,496

[22] Filed: Mar. 26, 1998

Related U.S. Application Data

[63] Continuation-in-part of application No. 08/948,344, Oct. 9, 1997, Pat. No. 5,928,597.
[51] Int. Cl.$^7$ .......................... B29C 33/04; B29C 43/10; B29C 51/10; B29C 51/14; B29C 51/36
[52] U.S. Cl. ..................... 264/510; 264/101; 264/313; 264/322; 264/553; 264/554; 264/571; 264/DIG. 65; 264/DIG. 78; 425/405.1
[58] Field of Search ................................... 264/510, 511, 264/553, 554, 571, DIG. 65, DIG. 78, 313, 322, 316, 101; 425/405.1

[56] References Cited

U.S. PATENT DOCUMENTS

| | | |
|---|---|---|
| 1,311,342 | 7/1919 | Gloetzner . |
| 2,978,008 | 4/1961 | Conti . |
| 3,580,795 | 5/1971 | Eichenlaub ............................ 156/583 |
| 3,964,958 | 6/1976 | Johnston ................................. 156/382 |
| 3,979,487 | 9/1976 | Squier et al. ............................ 264/24 |
| 4,211,590 | 7/1980 | Steward et al. ........................ 156/79 |
| 4,267,142 | 5/1981 | Lankheet ................................ 264/510 |
| 4,327,049 | 4/1982 | Miller ..................................... 264/138 |
| 4,488,862 | 12/1984 | Epel et al. ......................... 425/405 R |
| 4,504,341 | 3/1985 | Radzwill et al. ....................... 156/102 |
| 4,551,085 | 11/1985 | Epel et al. ......................... 425/405 R |
| 4,612,149 | 9/1986 | Iseler et al. ............................ 264/101 |
| 4,855,097 | 8/1989 | Iseler et al. ............................ 264/102 |
| 4,867,924 | 9/1989 | Schilkey et al. ....................... 264/101 |
| 5,106,568 | 4/1992 | Honka ..................................... 264/510 |
| 5,130,071 | 7/1992 | Iseler et al. ............................ 264/102 |
| 5,217,563 | 6/1993 | Niebling et al. ....................... 156/382 |
| 5,370,521 | 12/1994 | McDougall .......................... 425/405.1 |
| 5,378,134 | 1/1995 | Blot et al. ............................... 425/149 |
| 5,382,150 | 1/1995 | Henrio .................................... 425/390 |
| 5,425,627 | 6/1995 | Reil et al. ............................... 425/343 |
| 5,427,599 | 6/1995 | Greschner et al. ...................... 65/305 |
| 5,462,786 | 10/1995 | Van Ert .................................. 428/171 |
| 5,486,256 | 1/1996 | Romesberg et al. ................... 156/251 |
| 5,503,903 | 4/1996 | Bainbridge et al. .................... 428/182 |
| 5,582,906 | 12/1996 | Romesberg et al. ................... 428/286 |
| 5,591,289 | 1/1997 | Souders et al. ......................... 156/148 |
| 5,683,796 | 11/1997 | Kornylo et al. ..................... 428/304.4 |
| 5,688,353 | 11/1997 | Dublinski et al. ..................... 156/256 |

FOREIGN PATENT DOCUMENTS

| | | |
|---|---|---|
| 62 97 27 B2 | 10/1992 | Australia . |
| 0 633 124 A1 | 1/1995 | European Pat. Off. . |
| 44 41 552 A1 | 5/1996 | Germany . |
| WO 91 01 871 A1 | 2/1991 | WIPO . |

OTHER PUBLICATIONS

Derwent Abstract corr. to DE 4441552–A1.
International Search Report for PCT/US98/19991.

*Primary Examiner*—Jan H. Silbaugh
*Assistant Examiner*—Michael I. Poe
*Attorney, Agent, or Firm*—Brooks & Kushman P.C.

[57] ABSTRACT

A method for forming a vehicle headliner comprises providing at least one layer of formable material and a cover member; heating the layer and the cover member; providing a mold having a pair of mold halves and a compressible seal disposed between the mold halves, at least one of the mold halves having an aperture and a channel in communication with the aperture; positioning the layer and the cover member between the mold halves; bringing the mold halves toward each other to effect a sealed relationship; and applying a vacuum pressure to the aperture to sufficiently draw the mold halves together and compress the seal, thereby compressing the at least one layer and the cover member together to form the headliner.

17 Claims, 4 Drawing Sheets

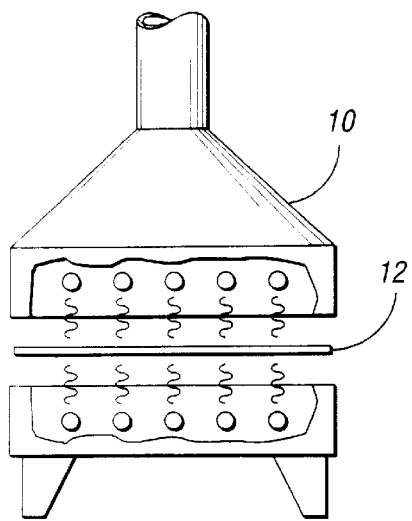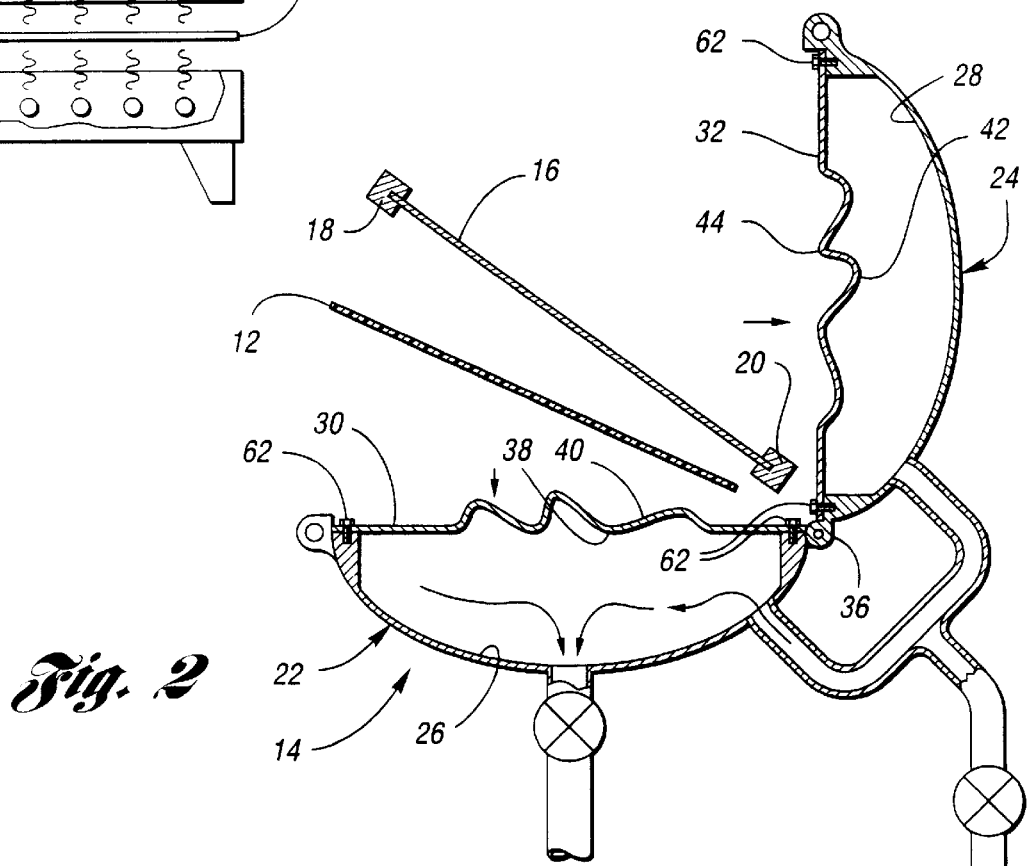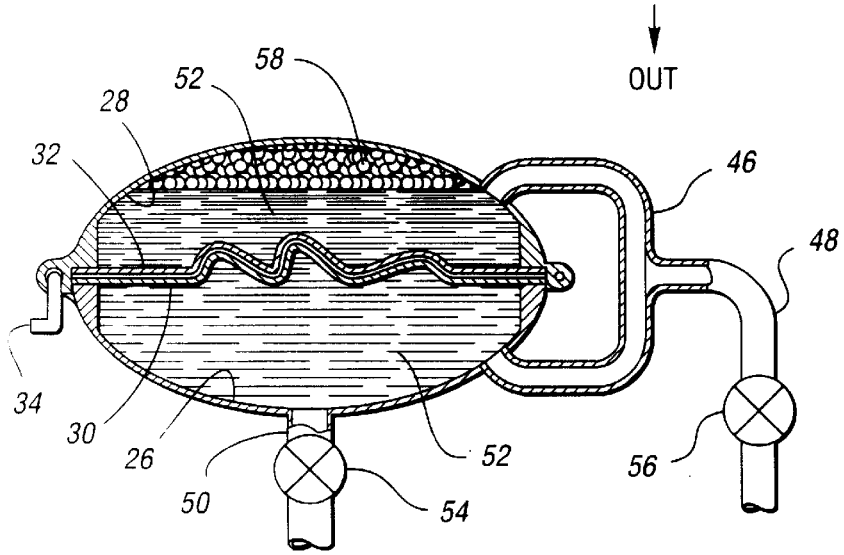

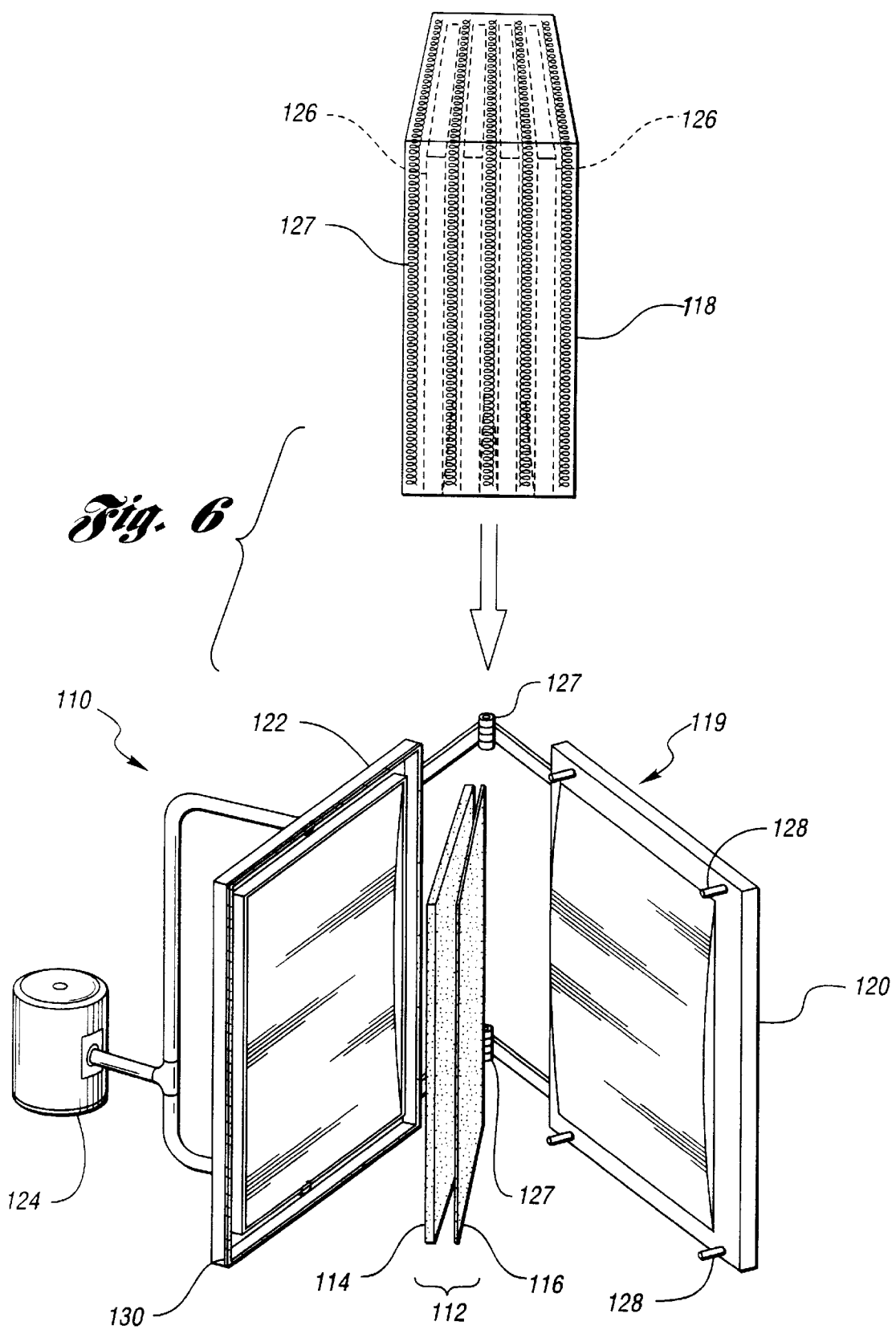

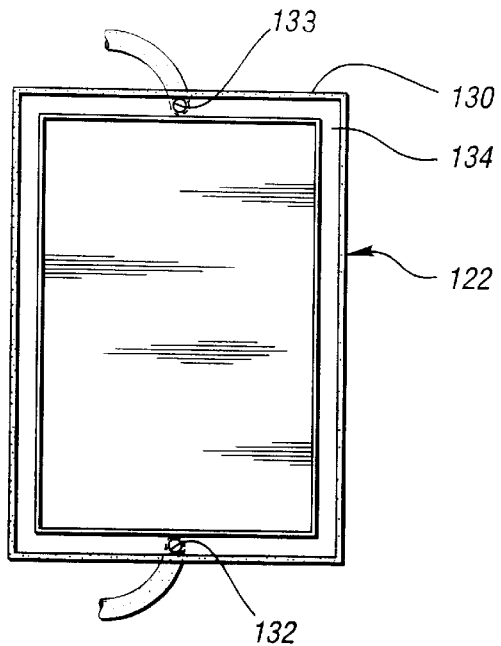
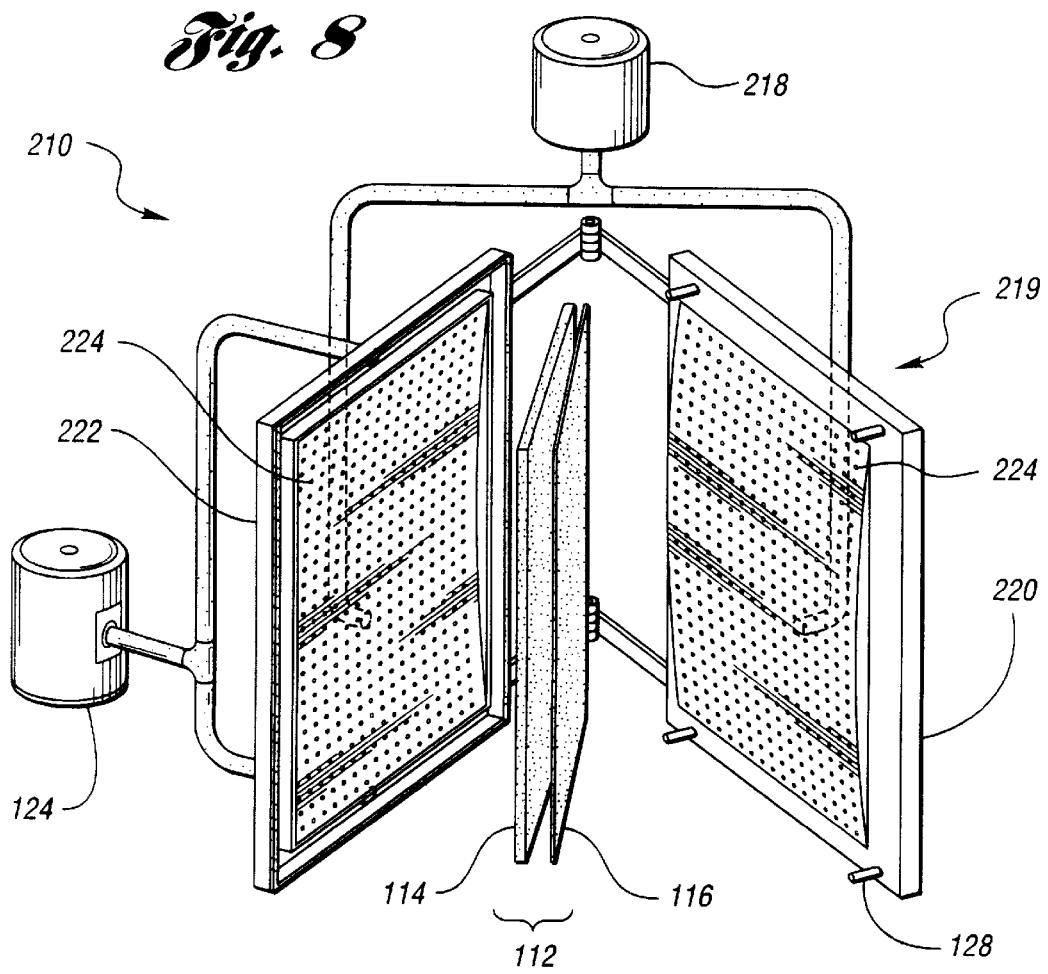

METHOD FOR MOLDING HEADLINERS

RELATED APPLICATION

This application is a continuation-in-part of application Ser. No. 08/948,344, which was filed on Oct. 9, 1997, now U.S. Pat. No. 5,928,597, and is hereby incorporated by reference.

TECHNICAL FIELD

The invention relates to a method and apparatus for molding motor vehicle headliners.

BACKGROUND ART

A common method of thermoforming plastic parts is compression molding. Compression molding usually uses solid molding tools, such as epoxy or composite materials cast around a copper cooling line configuration. Compression molding is used for thermoforming of sheet material, and is also used for attaching a cover material to a sheet article as the sheet article is thermoformed.

A significant problem experienced in compression molding is that epoxy or composite cast molds generally include a variety of hot spots on the mold surface which are spaced away from the copper cooling lines as a result of the configuration of the part being formed, or other tool design restrictions. These hot spots in the compression mold require significant cooling time for heat to be drawn away from the mold surface into the nearest cooling lines, which may substantially increase cycle time per part.

Another problem with such structures is that significant tool building time is required, as well as significant costs in preparation of the tool. Also, utilities, such as electricity, and support equipment, such as large hydraulic/electrical presses with water cooling equipment and controls, are required.

Accordingly, it is desirable to provide a method and apparatus for thermoforming sheet articles in which cycle time is reduced, tool preparation time is reduced, tooling costs are reduced, and capital equipment, support equipment and utilities costs and requirements are also reduced.

Compression molding is also used to make headliners to cover the interior surface of a motor vehicle roof. The press used to compress the mold halves together, however, is relatively large and expensive. Because the mold halves are relatively thick and require a significant amount of time to cool, moreover, cycle time per part is increased. The mold halves are also relatively heavy and expensive to manufacture.

U.S. Pat. No. 4,327,049 discloses another method of making headliners which includes compression molding multiple layers of pre-heated materials in a mold having two mold halves. These mold halves include a plurality of passages through which coolant fluid is routed to adequately cool the mold. Consequently, this method involves significant tooling and equipment costs.

SUMMARY OF THE INVENTION

The present invention provides a method for forming a vehicle headliner. The method comprises providing at least one layer of formable material, inserting the layer into a mold having two mold halves, bringing the mold halves toward each other to effect a sealed relationship, and developing a vacuum pressure within the mold to draw the mold halves sufficiently together so as to form the layer.

An apparatus for forming the vehicle headliner from at least one layer of formable material is also disclosed. The apparatus comprises a mold having a pair of mold halves and a compressible seal disposed between the mold halves, at least one of the mold halves having at least one aperture; and means for applying a vacuum pressure to the aperture to sufficiently draw the mold halves together and compress the seal, thereby forming the at least one layer.

Numerous applications for the present invention are contemplated within the scope of the present invention. For example, the present invention may be used for securing a cover material to a preheated plastic sheet while forming the plastic sheet, and the invention is applicable to both thermosets and thermoplastic materials.

Accordingly, an object of the invention is to provide an improved method for forming the headliner which does not involve significant capital equipment or tooling costs.

Another object of the invention is to provide a method for forming the headliner in which the mold halves are drawn together by a vacuum pressure.

Another object of the invention is to provide a method for forming the headliner which includes heating the formable layer by blowing steam into the mold.

It is yet another object of the invention to provide a method for forming the headliner which includes heating the formable layer by blowing heated air into the mold.

It is still yet another object of the invention to provide an apparatus for making the headliner which does not involve significant equipment or tooling costs.

A more specific object of the invention is to provide a method for forming the vehicle headliner which includes providing at least one layer of formable material and a cover member; heating the layer and the cover member; positioning the layer and the cover member between a pair of mold halves, one of the mold halves having an aperture and a channel in communication with the aperture; bringing the mold halves toward each other into a sealed relationship; and applying a vacuum pressure to the aperture to draw the mold halves together so as to compress the at least one layer and the cover member together, thereby forming the headliner.

These and other objects, features and advantages of the invention are readily apparent from the following detailed description of the best modes for carrying out the invention when taken in conjunction with the accompanying drawings.

BRIEF DESCRIPTION OF THE DRAWINGS

FIG. 1 shows a schematically arranged side view of an oven for heating a sheet article in accordance with the present invention;

FIG. 2 shows a schematically arranged sectional side view of a pressure vessel with a sheet article and cover material being inserted therein;

FIG. 3 shows a schematically arranged sectional side view of the pressure vessel of FIG. 2 in the closed position;

FIG. 6 is a perspective view of an apparatus according to the invention for forming a motor vehicle headliner;

FIG. 7 is a side view of a mold half of the apparatus of FIG. 6 showing a pair of vacuum apertures and a vacuum channel; and FIG. 8 is a perspective view of another embodiment of the apparatus shown in FIGS. 6 and 7.

BEST MODES FOR CARRYING OUT THE INVENTION

Figure 4:
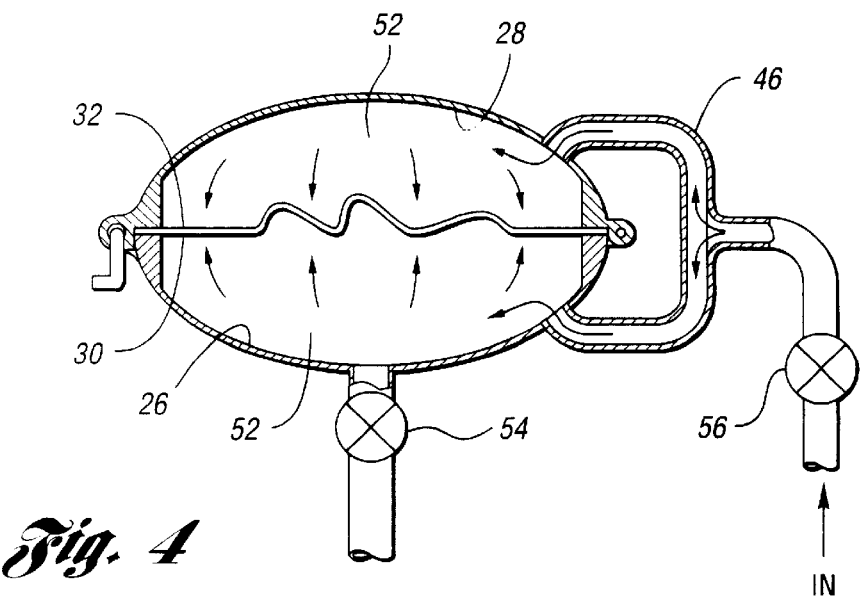
FIG. 4 shows a schematically arranged sectional side view of the pressure vessel of FIG. 2 with the liquid chambers being pressurized.

One aspect of the present invention has been termed "low pressure hydra molding". This process was developed to reduce the cost of tooling for thermoforming sheet goods, especially for simultaneous bonding of covering material thereon. The invention is, preferably, intended for use with vehicle interior trim panels, but is, of course, applicable to a wide variety of sheet articles to be thermoformed.

Typical sheet plastics to be formed are wood stock, polywood, ABS sheets and flax polypropylene, with a wide variety of cover materials, such as cloth, vinyl, carpet, etc.

The basic principal of the invention is to pressurize equally both sides of a pressure vessel with a low pressure liquid, which also acts as a coolant. The pressure vessel includes thin shell surfaces which are operative to form the part, and which allow even cooling of the part being formed. The present invention is described in greater detail with reference to FIGS. 1–5.

Referring to FIG. 1, an oven 10 is shown for preheating a sheet article 12 prior to thermoforming of the sheet article 12.

Referring to FIG. 2, once the sheet article 12 has been preheated in the oven 10, it is positioned within a pressure vessel 14 for thermoforming. In the preferred embodiment, a cover material 16 is also inserted into the pressure vessel 14, and is positioned by means of the holders 18,20.

The pressure vessel 14 includes first and second vessel halves 22,24, each of which includes a liquid (fluid) chamber 26,28 therein, respectively. The first and second vessel halves 22,24 may comprise a cast aluminum, fabricated steel, fiberglass, carbon fiber composite, etc.

The first and second vessel halves 22,24 also each include a thin shell 30,32 respectively, for forming the sheet article 12 to a desired shape, as defined by the surface configuration of the thin shells 30,32.

The thin shells 30,32 may be comprised of a metal, fiberglass, nickel plated, carbon fiber, cast aluminum, or other material. If the thermoforming is to be performed on a thermoset material, then a metal or ceramic shell will likely be used because it will enhance generation of heat, and a hot oil or steam would be circulated in the fluid chambers 26,28. If the thermoforming is to be performed on a thermoplastic material then a softer shell would be used.

In the preferred embodiment, the thin shells 30,32 are at least partially flexible so that the first and second vessel halves 22,24 can be closed together without forming the part to the desired shape during the closure. This flexibility of the thin shells, 30,32 may be accomplished by providing a flexible diaphragm type configuration around the periphery of the thin shells, 30,32, or merely by forming the thin shells 30,32 of a flexible material.

The first and second vessel halves 22,24 are pivotally connected to one another at the pivot joint 36 to allow opening and closing of the pressure vessel 14. As shown in FIG. 2, the thin shells 30,32 each include first and second surfaces 38, 40, 42, 44, respectively. The first surfaces 38,42 border the liquid chambers 26,28, respectively, and the second surfaces 40,44 are configured to engage and form the sheet article 12 and cover material 16.

Turning to FIG. 3, once the sheet article 12 and cover material 16 have been inserted between the vessel halves, 22,24, the vessel halves 22, 24 are closed together and clamped by the clamp 34. Because the thin shells 30,32 are at least partially flexible, the latch 34 may be engaged while the sheet article 12 and cover material 16 are not yet completely formed to the desired shape. Preferably, the upper thin shell 32 is less flexible because it must support the weight of the liquid above it, and the lower thin shell 30 is comparatively more flexible.

A conduit 46 is configured to provide fluid communication between the first and second liquid chambers 26,28. Feed and return lines 48,50 are provided for feeding and returning liquid 52 to and from the liquid chambers 26,28. Valves 54,56 are provided for controlling such flow.

As illustrated schematically in FIG. 3, a plurality of light, hard fillers 58 are provided in the upper liquid chamber 28 to reduce the volume of liquid in the liquid chamber 28 for weight reduction and ease of handling. The fillers 58 may comprise hard styrofoam blocks, hollow ping-pong ball type structures, or any similar light weight, hard, water resistant object.

The liquid 52 in the liquid chambers 26,28 could comprise water, oil, etc.

Turning to FIG. 4, the inlet valve 56 is then opened and the outlet valve 54 is closed in order to feed the water 52 into both liquid chambers 26, 28. The conduit 46 provides fluid communication between the opposing liquid chambers 26,28 to equalize fluid pressure within the liquid chambers 26,28. Preferably, the liquid pressure is maintained in a low range, approximately 5 to 100 p.s.i. Because of the large surface area of the thin shells, 30,32, a low liquid pressure will generate a tremendous force for forming the sheet article 12 and cover material 16. Because the liquid 52 contacts a major portion of each of the thin shells, 30,32, cooling is greatly enhanced, which substantially reduces cycle time for forming the sheet article 12 and cover material 16. Specifically, the liquid directly contacts the entire surface area of the thin shell which is directly opposite the contoured, part-forming portion of the thin shell. Alternatively, the liquid may be replaced by compressed air for pressurization.

Figure 5:
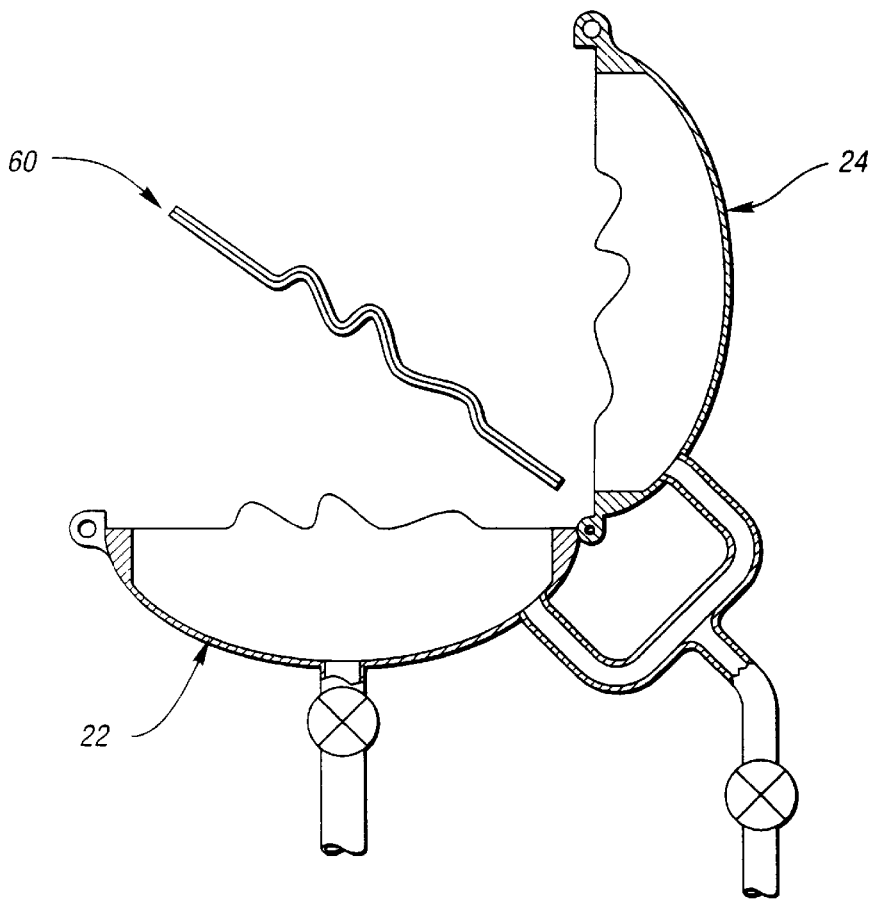
FIG. 5 shows a schematically arranged sectional side view of the pressure vessel of FIG. 1 with the thermoformed part being removed therefrom.

The force of the pressurized liquid 52 against the shells 30,32 forms the part to the desired shape while the liquid 52 draws heat away from the shells 30,32 to cool the part. After a sufficient period of time, the second vessel half 24 is pivoted away from the first vessel half 22 so that the formed part 60 may be removed from the pressure vessel 14, as shown in FIG. 5.

The present invention contemplates that the liquid 52 could be cycled through the liquid chambers 26,28 using a variety of flow sequences, or the liquid could remain stagnant in the liquid chambers 26,28.

Referring back to FIG. 2, removability features 62 are illustrated schematically to show that the thin shells 30,32 are easily interchangeable. Accordingly, when parts of different shape are required, only the thin shells, 30,32 must be replaced and stored. The thin shells 30,32 provide a substantial storage space requirement advantage over prior art compression molding operations, which require storage of large molds.

Of course, the pressure vessel 14 need not be a clam-shell type arrangement as described. Various configurations are contemplated. Also, the conduit 46 could be replaced by appropriate other means for equalizing pressure on opposing sides of the part to be formed, such as feed pumps and pressure sensors. Also, the liquid chambers 26,28 may be partially filled with air to reduce weight.

Accordingly, the present invention provides a lightweight tool which reduces utilities, capital equipment and support equipment costs. Also, hydraulic line cooling chillers are not required. Furthermore, the water pressure supply could come from any existing cooling tower system because only very low pressure is required.

Another aspect of the present invention has been termed "twin shell vacuum molding." FIG. 6 shows an apparatus 110 according to the invention for forming a motor vehicle headliner 112, which includes a formable layer 114 and a cover member 116. The apparatus 110 comprises a heating device such as an oven 118, a mold 119 having a pair of vertically oriented mold halves 120 and 122, and a vacuum source 124. The apparatus 110 is preferably arranged so that the oven 118 is disposed above the mold halves 120 and 122 to reduce floor space requirements. Alternatively, the oven 118 and mold halves 120 and 122 can be horizontally or otherwise oriented. The oven 118 has a plurality of slots 126, and each slot can receive one or more formable layers 114 and/or the cover member 116. Preferably, at least one heating element 127 is disposed adjacent each slot for selectively heating one or more formable layers 114 and/or the cover member 116 to the same or different temperatures. Alternatively, the heating device may be a hot air source, a steam source, a contact heater with one or more heated surfaces which may be applied to one or more surfaces of the material to be heated, or any other heating means known to those skilled in the art.

The formable layer 114 and the cover member 116 are first heated in the oven 118 to a predetermined temperature preferably in the range of 150° C. to 280° C., depending on the type of materials. The formable layer 114 may be any permeable or impermeable formable material which when sufficiently heated has a forming and/or compressive strength less than the ambient air pressure surrounding the apparatus 110. Such materials include thermoformable rigid urethane (TRU) and polyethylene terephthalate (PET). The cover member 116 preferably comprises nonwoven PET, but it may comprise any suitable permeable or impermeable cover material such as cloth, vinyl or carpet. Alternatively, heating of the cover member 116 may be eliminated, depending on the application, or the cover member may be eliminated entirely if the characteristics of the formable layer 114 are aesthetically satisfactory. Furthermore, multiple formable layers 114 may be utilized to form a headliner.

The mold halves 120 and 122 are relatively thin, with a thickness preferably in the range of 0.25 to 1.0 inches. The mold halves 120 and 122 preferably comprise epoxy resin, but they may be made of any other suitable material such as cast aluminum or nickel. The mold halves 120 and 122 are also preferably sufficiently rigid so that they do not substantially flex when forcefully biased together. Consequently, the mold halves 120 and 122 are able to accurately form the headliner into the desired shape with closely controlled tolerances. This can also be achieved when at least a portion, such as a peripheral portion, of at least one of the mold halves 120 and 122 comprises a relatively flexible material which readily collapses when subject to an external compressive force. Such a design is advantageous, for example, in forming rounded edges or other features on the headliner.

A pair of hinges 127 pivotally connect the mold halves 120 and 122 together to allow opening and closing of the mold 119. Alternatively, the mold halves 120 and 122 can be mounted on slides, cylinders, or any other mounting arrangement known to those skilled in the art, or each of the mold halves can be free standing. The mold half 120 has a plurality of collapsible or displacable pins 128 for holding the formable layer 114 and the cover member 116 within the mold 119.

As shown in FIG. 7, a seal 130 is disposed about the periphery of mold half 122 for creating a substantially gas or air-impermeable sealed relationship between the mold halves 120 and 122 when the seal is sufficiently compressed. The mold half 122 further has a pair of apertures 132 and 133 extending therethrough and a vacuum channel 134 in fluid communication with the apertures. The vacuum channel 134 enables a vacuum to initially be drawn along the periphery of the mold 119, which is particularly advantageous in the event the headliner 112 comprises substantially impermeable materials. If the headliner 112 comprises sufficiently permeable materials, then the vacuum channel 134 may be eliminated from the mold half 122. Alternatively, one or both mold halves 120 and 122 may have one or more apertures and/or channels through which below-ambient air pressure can be developed in the mold 119.

The vacuum source 124 is in fluid communication with the apertures 132 and 133, and is adapted to reduce the pressure within the mold 119 below ambient air pressure. The vacuum source 124 preferably achieves a pressure drop within the mold 119 in the range of 0.5 to 10 pounds per square inch (psi), depending on the type of materials to be formed and/or compressed. Across a typical mold half surface area of about 2,500 to 4,500 square inches, ambient air pressure is therefore able to apply a compressive force of about 1,250 to 45,000 pounds for drawing the mold halves 120 and 122 together.

After heating, the formable layer 114 and the cover member 116 are automatically or otherwise placed between the mold halves 120 and 122 and onto the displacable pins 128. Alternatively, the formable layer 114 and the cover member 116 may be supported in the mold 119 in any manner known to those skilled in the art, such as by mounting the formable layer and the cover member in a support frame which may be supported in the channel 134. The mold halves 120 and 122 are then brought toward each other manually or otherwise so that the mold halves are sufficiently sealed together. Vacuum is then developed by the vacuum source 124 to reduce the air pressure within the mold 119 below ambient air pressure. As a result, ambient air pressure forces the mold halves 120 and 122 together, thereby thermoforming the headliner 112 while further compressing the seal 130. During the thermoforming process, the formable layer 114 and the cover member 116 are bonded together and are shaped into the desired contour of the headliner 112. Adhesives may also be used to improve the bond between the formable layer or layers 114 and the cover member 116. Furthermore, the seal 130 may be configured to control the compression range of the mold 119. For example, a relatively stiff seal may be used to reduce the compression range of the mold 119. Alternatively, the cover member 116 can be molded or otherwise attached to a previously formed formable layer or layers 114.

Because the mold halves 120 and 122 are relatively thin and simple in construction, the mold halves are inexpensive to manufacture. Furthermore, because a press is not required to force the mold halves 120 and 122 together, the method and apparatus of the invention result in significantly reduced equipment costs compared with the prior art.

FIG. 8 shows another embodiment 210 of the apparatus including a heat source 218 and a mold 219 having a pair of mold halves 220 and 222. In addition to having the features of the mold halves 120 and 122 of the mold 119, each of the mold halves 220 and 222 also has a plurality of apertures 224 in fluid communication with the heat source 218. The heat source 218 may be used to generate and blow steam, heated air, or other heated fluid into the mold 219 to heat the formable layer 114 and the cover member 116, if used.

Alternatively, the mold halves can be thermally regulated in any manner known to those skilled in the art.

The formable layer 114 and the cover member 116, if used, are automatically or otherwise placed between the mold halves 220 and 222 and onto the displacable pins 128. The mold halves 220 and 222 are then brought toward each other manually or otherwise so that the mold halves are sufficiently sealed together. Heated fluid is then generated by the heat source 218, and the fluid is blown into the mold 219 to heat the formable layer 114 and the cover member 116 to approximately 150° C. to 280° C., depending on the type of materials. Consequently, the formable layer 114 and the cover member 116 may not require preheating prior to being inserted into the mold 219. Vacuum is then developed by the vacuum source 124 to reduce the air pressure within the mold 219 below ambient air pressure. As a result, ambient air pressure forces the mold halves 220 and 222 together, thereby thermoforming the headliner 112 while further compressing the seal 130.

The invention has been described in an illustrative manner, and it is to be understood that the terminology which has been used is intended to be in the nature of words of description rather than of limitation. Obviously, many modifications and variations of the invention are possible in light of the above teachings. For example, the method and apparatus may be used to form various automotive articles such as package trays, trunk liners, floor liners, hood insulators and door panels. Furthermore, the method and apparatus may be used to form non-automotive articles such as office dividers and tack boards. It is, therefore, to be understood that within the scope of the appended claims, the invention may be practiced otherwise than as specifically described.

What is claimed is:

1. A method for thermoforming an article, the method comprising:

providing at least one layer of formable plastic material;

heating the at least one layer of formable plastic material;

inserting the at least one layer of formable plastic material into a mold having first and second thin mold halves, each thin mold half having a non-planar configuration, one thin mold half having at least one aperture in fluid communication with a vacuum source;

moving one of the thin mold halves toward the other thin mold half to effect a sealed relationship between the thin mold halves by compressing a compressible seal disposed about a periphery of one of the thin mold halves; and applying a vacuum pressure to the at least one aperture by the vacuum source to reduce air pressure within the mold to thereby cause ambient air pressure to forcefully bias the thin mold halves sufficiently together so as to further compress the seal and form the at least one layer of formable plastic material to a contour corresponding to the non-planar configurations of the thin mold halves;

wherein each thin mold half is sufficiently rigid such that the thin mold halves do not substantially flex when the thin mold halves are forcefully biased together, thereby accurately forming the at least one layer of formable plastic material to the contour.

2. The method of claim 1 wherein the at least one layer is air permeable.

3. The method of claim 1 wherein the compressible seal enables the mold halves to be drawn together when the vacuum pressure is applied to the at least one aperture by the vacuum source.

4. The method of claim 1 wherein the heating step comprises preheating the at least one layer prior to inserting the at least one layer into the mold.

5. The method of claim 1 wherein at least one of the mold halves has a flexible portion.

6. The method of claim 1 wherein at least one of the mold halves has at least one pin for holding the at least one layer within the mold.

7. The method of claim 1 wherein at least one of the mold halves has a channel in fluid communication with the at least one aperture.

8. The method of claim 1 further including providing a formable cover member and inserting the cover member into the mold with the at least one layer.

9. The method of claim 1 wherein the mold halves are hinged together.

10. The method of claim 1 wherein each mold half has a thickness of less than 1.0 inches.

11. The method of claim 1 wherein each mold half has a thickness of less than 0.5 inches.

12. The method of claim 1 wherein at least one mold half has a plurality of apertures in communication with the non-planar configuration of the at least one mold half for applying the vacuum pressure.

13. The method of claim 1 wherein each mold half has a plurality of apertures in fluid communication with the non-planar configurations of each mold half for applying the vacuum pressure.

14. The method of claim 1 wherein the heating step comprises heating the at least one layer after inserting the at least one layer into the mold.

15. The method of claim 14 wherein heating comprises blowing steam into the mold.

16. The method of claim 14 wherein heating comprises blowing heated air into the mold.

17. A method for thermoforming a vehicle headliner, the method comprising:

providing at least one layer of formable plastic material and a cover member;

heating the at least one layer of formable plastic material;

providing a mold having first and second thin mold halves and a compressible seal disposed between the thin mold halves and about a periphery of one of the thin mold halves, each of the thin mold halves having a non-planar configuration, at least one of the thin mold halves having at least one aperture in fluid communication with a vacuum source and a channel along a periphery of the mold in fluid communication with the at least one aperture;

positioning the at least one layer of formable plastic material and the cover member between the thin mold halves;

moving one of the thin mold halves toward the other thin mold half to effect a sealed relationship between the thin mold halves;

applying a vacuum pressure to the at least one aperture and the channel by the vacuum source to reduce air pressure within the mold to thereby cause ambient air pressure to forcefully bias the thin mold halves together and compress the seal, thereby compressing the at least one layer of formable plastic material and the cover member together and forming the at least one layer of formable plastic material and the cover member to a contour corresponding to the non-planar configurations of the thin mold halves;

wherein each thin mold half is sufficiently rigid such that the thin mold halves do not substantially flex when the thin mold halves are forcefully biased together, thereby accurately forming the at least one layer of formable plastic material and the cover member to the contour.

* * * * *